Figure 1:
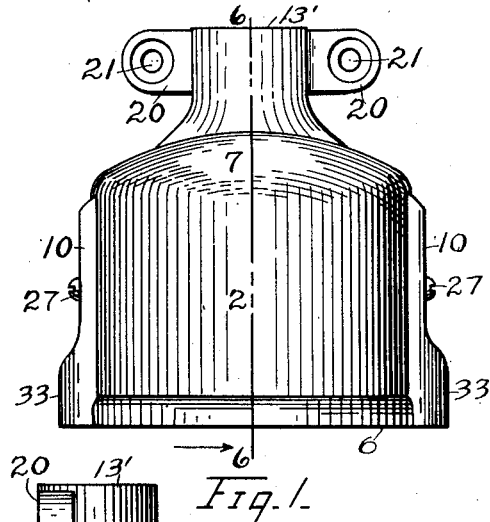

S. B. VAN RANST.
ELECTRIC FITTING.
APPLICATION FILED FEB. 11, 1910.
1,261,874.
Patented Apr. 9, 1918.
2 SHEETS—SHEET 2.
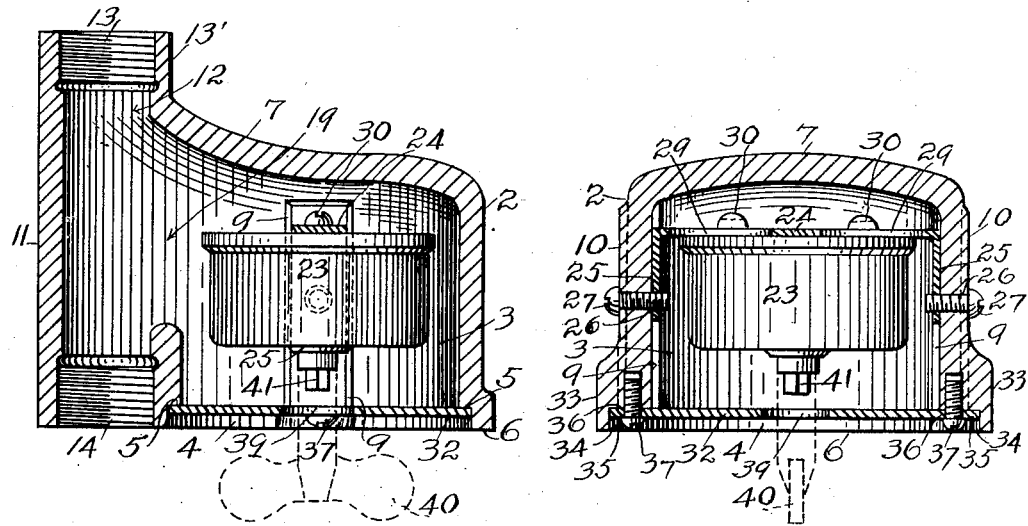
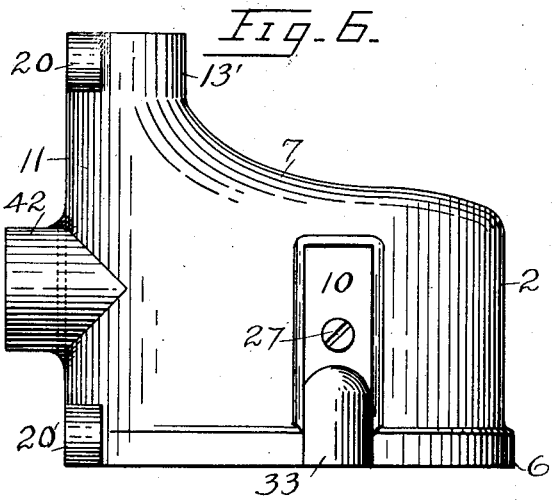
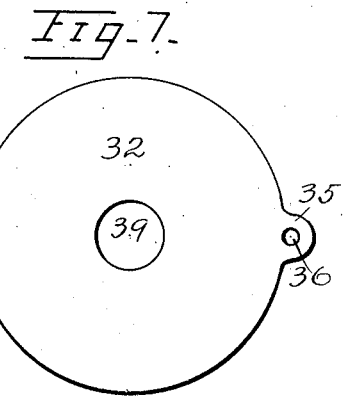
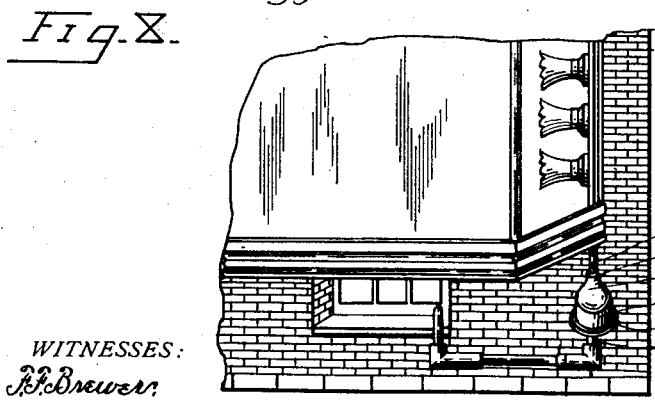
WITNESSES:
J.F.Brewer
R.L. Wallace
INVENTOR.
Samuel B. Van Ranst.
BY Harry L. Wallace
ATTORNEY.

UNITED STATES PATENT OFFICE.

SAMUEL B. VAN RANST, OF SYRACUSE, NEW YORK, ASSIGNOR TO CROUSE-HINDS COMPANY, OF SYRACUSE, NEW YORK, A CORPORATION OF NEW YORK.

ELECTRIC FITTING.

1,261,874.

Specification of Letters Patent.

Patented Apr. 9, 1918.

Application filed February 11, 1910. Serial No. 543,294.

*To all whom it may concern:*

Be it known that I, SAMUEL B. VAN RANST, a citizen of the United States, residing at Syracuse, in the county of Onondaga and State of New York, have invented certain new and useful Improvements in Electric Fittings, of which the following is a specification.

This invention relates to improvements in electric conduit fitting, designed for use as a receptacle or housing for a snap-switch, and the invention relates particularly to a fitting capable of being connected to conduit pipes, especially where the latter are located on the outside of a building and exposed to the weather.

In many cities, at present, the lighting companies are furnishing show-window lighting, sign-lighting, and other display or decorative lighting at a flat rate, for a certain number of hours per night. In installations of this kind, the lighting company usually assumes the responsibility of turning the lights off at a specified time. In order to accomplish this in a simple and ready manner it is desirable to have a suitable switch conveniently located in an inconspicuous place, preferably outside the building. To this end, it is an object of the present invention to provide a suitable fitting to receive and protect a switch directly connected with the lighting wires, by means of which, the lights may be turned " off " and " on ", at will, by an authorized person, without requiring him to enter the building. Where the fitting is located outside of a building, it is necessarily subjected to inclement and foul weather. To protect the switches and wiring from rain and snow, and also from the water used in washing the windows, it is a further object to provide fittings for the purpose constructed and arranged in a manner to be entirely weather and waterproof.

A further object of the invention is to provide a fitting, for supporting and inclosing a snap or other like safety switch or any suitable electrical appliance, and to equip the fitting with means for preventing unauthorized persons from gaining access to, or tampering with the switch or the lights. And a further object is to provide a fitting of the class adapted for connecting with two or more conduit pipes, such as are employed for "through" wiring, and in which switches arranged to be operated by keys instead of the usual hand-piece or knobs, may be installed, and whereby a single group or a number of groups or clusters of lights may be controlled and operated by a switch mounted in a single fitting.

The invention consists of the features and parts set forth in the detail description which follows, illustrated by the accompanying drawings, and then particularly pointed out in the appended claims.

Figure 2:
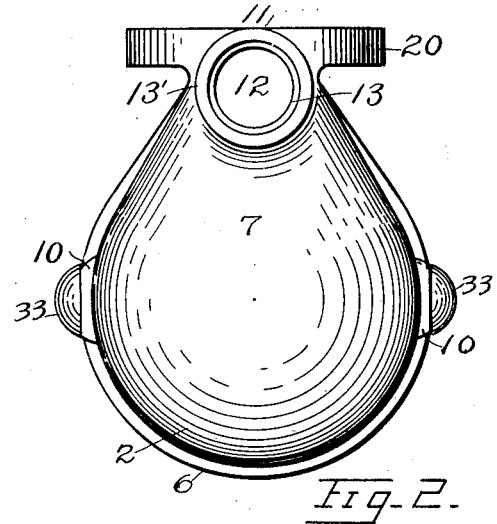
Figure 3:
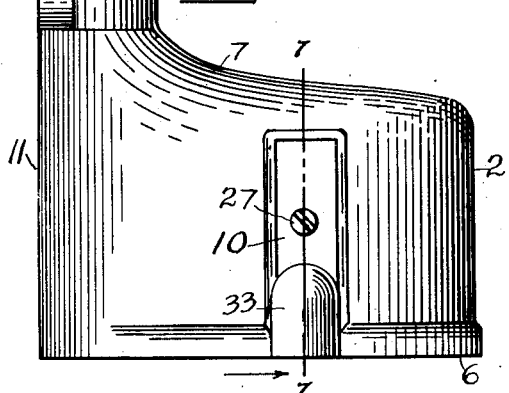
Figure 4:
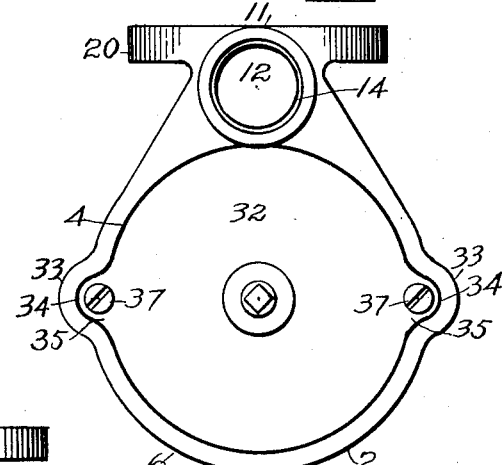
Figure 5:
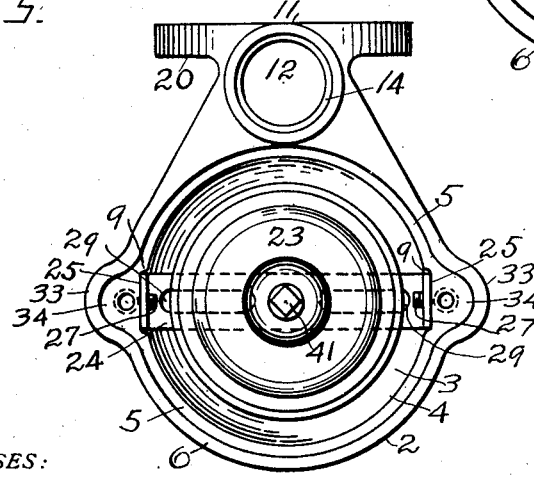

In the accompanying drawings, Figure 1 is a front elevational view of the fitting. Fig. 2 is a top plan view. Fig. 3 is a side elevation. Fig. 4 is a bottom plan view, showing the cover in place. Fig. 5 is a bottom plan view, the cover being removed, showing the interior arrangement of the fitting equipped with key-operated snap-switch. Fig. 6 is a vertical longitudinal section on line 6—6 of Fig. 1. Fig. 7 is a vertical transverse section on line 7—7 of Fig. 3. Fig. 8 is a view of a modified form of fitting, showing a third nipple projecting rearwardly from the body. Fig. 9 is a detail plan view of the cover. Fig. 10 is a perspective view, showing the fitting applied adjacent to a store window.

In the accompanying drawings, my conduit fitting is shown as an irregular shaped body or part, preferably made of cast metal, having an enlarged front portion 2 in which is formed a cylindrical cavity or chamber 3, provided with a circular opening or mouth 4, which is internally rabbeted to provide an annular abutment or ledge 5 which faces downwardly and is surrounded by an unbroken depending marginal flange or lip 6, having a greater diameter for a portion of its circumference than the chambered body. The upper portion or extremity of the chamber 3 is closed by a rearwardly inclining and laterally curved or arched roof 7, which completely incloses the upper end of the chamber and is externally arranged to shed water falling upon the body.

In each of the lateral inner side walls of the chamber 3, like coacting grooves or channels 9 are formed, and the opposite outer surfaces of the casing 2 are provided with correspondingly raised portions or ribs 10 for reinforcing the wall of the casing. The channels 9 and also the ribs 10 are arranged vertically.

The rear side 11 of the body is contracted as compared with the front portion, and is provided with a cylindrical opening 12, arranged vertically through the body parallel to the chamber 3. The rear side 11 of the body is contracted by forming the same with converging substantially flat side walls extending from diametrically opposite sides of the cylindrical side walls of the body. The top and bottom ends of the passage 12 are internally threaded to form nipples 13 and 14, to receive a number of conduit pipes, as 15 and 16, which are intended for inclosing electric wires (not shown), the nipple 13 being arranged in a cylindrical hub 13' which projects above the top 7 of the chamber 3. The cavity 3 is arranged to communicate with the conduit opening 12, by means of a large opening 19 which occurs between the nipples 13 and 14. The provision of the through conduit opening 12 and its arrangement relatively to the switch chamber 3, as herein shown, requires a special and novel construction for the body of the fitting, as compared with other fittings of the class designed for "dead-end" conduit work.

20 represents a bracket for attaching the fitting to a wall or other support, and consists of an integral bar arranged across the rear side of the body at right angles to the opening 12, the opposite end arms of the bracket project laterally beyond the sides of the hub 13' and each arm is perforated, as at 21, 21, to receive screws, nails or other securing devices.

23 represents a switch mechanism, preferably of the key operated rotary type, which is disposed in the chamber 3 in inverted position. The switch is mounted upon a U-shaped support 24, having depending lugs or arms 25, each of which have threaded perforations 26 to receive screws 27, which may be inserted through corresponding perforations in the ribs 10, for holding the said lugs in the channels 9 flush with the inner surface of the chamber, for rigidly securing the switch support 24 in the desired position, as shown. 29 represents slots formed in the body of the support 24, to receive screws 30, by which the switch mechanism 23 may be attached to the support. The slots 29 are also arranged for mounting switches of different sizes and makes upon the support. In practice, the switch is first attached to the support 24 and the two parts are inserted in the chamber 3, the lugs 25 sliding and remaining in the channels or seats 9, which prevent the shifting or displacement of the switch and bracket 24. The seats are also arranged to permit the lugs of the support to be disposed flush with the inner surface of the chamber to provide suitable clearance for the switch mechanism.

32 represents a flat circular cover which is arranged to fit into the rabbeted border for closing the mouth of the chamber 3. The cover preferably rests upon the ledge 5 of the mouth 4 which affords a firm and level support or bearing therefor, and the depending flange 6 extends below and entirely skirts the cover. At opposite sides of the mouth of the casing at the lower extremities of the ribs 10, which are expanded outwardly for the purpose, semi-circular projections 33 are formed, and in these are arranged sockets or recesses 34 which receive corresponding lugs or ears 35 formed oppositely on the peripheral edge of the cover 32. The ears of the cover are perforated, as at 36, and coinciding threaded holes are formed concentrically in the socket 34, to receive screws 37 employed for securing the cover in the mouth of the casing. The cover is perforated centrally, as 39, for permitting the insertion of a key 40, which may be applied to a concentrically arranged arbor or shaft 41, which projects from the switch body 23, and by which the switch mechanism may be operated for turning on, or turning off, electric lights controlled by the switch.

Fig. 8 illustrates a modified form of fitting, in which is shown a third nipple 42 arranged on the rear side 11 of the casing, and may connect with the conduit, opening 12, and additional securing lug 20' is also located near the bottom of casing. This style of fitting, which in all other respects may be the same as the fitting hereinbefore shown and described, is adapted for both through and branch conduit piping and wiring, thus obviating the necessity of providing separate fittings for each circuit of a multiple lighting installation.

It is obvious that the present fitting may be employed for inclosing electrical appliances other than snap-switches or cut-outs, and that some changes or modifications may be made in the parts, without departing from the spirit of the invention as defined by the appending claims, and I therefore do not limit myself to the precise construction, arrangement and application herein shown and described.

Having thus described my invention, what I claim as new and desire to secure by Letters Patent, is—

1. An electrical fitting comprising a hollow body open at one end for permitting the insertion and removal of an electrical appliance, and a support for such electrical appliance, insertible in and removable from the body through the open end and having means for engaging a side wall of the body, and a fastening member extending transversely through the side wall from the outside thereof and into said portion of the support, substantially as and for the purpose described.

2. An electrical fitting comprising a hollow body open at one end for permitting the insertion and removal of an electrical appliance, the side walls of the body being provided with interior lengthwise guides on opposite sides thereof, a support for the electrical appliance, the support being of different form than the interior of the body and the support being movable into and out of the body through the open end thereof, and having means for engaging said guides and means for securing the support in the body, substantially as and for the purpose specified.

3. An electrical fitting comprising a hollow body open at one end for permitting the insertion and removal of an electrical appliance, the side walls of the body being provided with interior lengthwise guides on opposite sides thereof, and a support for the electrical appliance, the support being movable into and out of the body through the open end thereof, and having means for engaging said guides, and means extending transversely through the side walls of the body into engagement with the means of the support coacting with the guides, substantially as and for the purpose set forth.

4. An electrical fitting comprising a hollow body including a casing for an electrical appliance, the casing being open at one end for permitting the insertion and removal of such appliance, and the casing being formed with interior grooves in opposite sides thereof, the grooves opening through the open end of the casing, and a support for the electrical appliance having means extending into the grooves and secured therein, substantially as and for the purpose described.

5. An electrical fitting comprising a hollow body including a casing for an electrical appliance, the casing being open at one end for permitting the insertion and removal of such appliance, and the casing being formed with interior grooves in opposite sides thereof, the grooves opening through the open end of the casing, and a support for the electrical appliance, said support being U-shaped in general outline and the intermediate portion thereof being secured to the appliance and the opposite arms thereof, lying in the grooves and being secured therein, substantially as and for the purpose specified.

6. An electrical fitting comprising a hollow body including a casing for an electrical appliance, the casing being open at one end for permitting the insertion and removal of such appliance, and the casing being formed with interior grooves in opposite sides thereof, the grooves opening through the open end of the casing, and a support for the electrical appliance, said support being U-shaped in general outline and the intermediate portion thereof being secured to the appliance and the opposite arms thereof, lying in the grooves and being secured therein, and fastening members extending from the outside of the case transversely through the walls thereof and into the grooves and arms of the support, substantially as and for the purpose set forth.

7. An electrical fitting comprising a hollow body including a casing for an electrical appliance, the casing being open at one end for permitting the insertion and removal of such appliance, and the casing being formed with interior depressions in its opposite sides thereof extending lengthwise of the body from the open end toward the opposite end thereof, a support for the electrical appliance having means extending into such depressions, and a closure for the open end of the casing, substantially as and for the purpose described.

8. A fitting, comprising a cylindrical body interiorly arranged to inclose a snap-switch, the casing having one open end for inserting the switch, the interior of the casing grooved at its opposite sides to provide guides for mounting a switch support, the said grooves forming the inner sides of a series of ribs arranged on the outer surface of the casing, and intersecting the recess in the open end of the casing, substantially as and for the purpose specified.

9. A fitting, comprising a body interiorly arranged to inclose a rotary snap-switch, the casing having one open end for inserting the switch, and having its open end recessed to receive a cover hinged to the outside of the casing, the interior of the casing grooved at its opposite sides to provide guides for mounting a switch support, and said grooves intersecting the recess in the open end of the casing, and means for securing the casing to a support, substantially as and for the purpose set forth.

10. A conduit fitting, comprising a hollow cylindrical body having one open end, the opposite end closed and arched to shed water, oppositely facing channels formed in the inner walls of the body, and a U-shaped support for a switch, said support having slots for mounting switches of different makes, and having its opposite ends formed into depending arms arranged at right angles to the body of the support and adapted to fit in the said channels, and means for securing the support to the body, substantially as and for the purpose described.

11. A fitting, comprising a hollow casing having one open end for inserting and manipulating a switch mechanism, the open end of the casing having an expanded depending flange for forming an inwardly facing recess to receive a cover, the interior of the casing having oppositely arranged grooves forming guides for receiving a switch support, the said grooves intersecting the recess in the open end of the casing, and means for attaching the casing to a conduit pipe, substantially as and for the purpose specified.

12. A conduit fitting, comprising a hollow body having one open end, oppositely facing channels formed into the inner walls of the body extending from the open end to the closed end thereof, a support for a switch, said support having its opposite ends arranged to slidably fit into the said channels, and a pair of screws piercing the sides of the body and the opposite ends of the support, for holding the latter in place, substantially as and for the purpose set forth.

13. A fitting, comprising a hollow casing, open at one end, the interior of said casing having oppositely facing channels for receiving a support for electric appliances, and having external ribs arranged opposite said seats for strengthening the walls at such points, the said ribs having their lower ends expanded and recessed to provide screw-sockets for securing a cover concentric to the open end of the casing.

14. An electrical appliance comprising a casing including a portion having substantially semi-cylindrical side walls, and a portion projecting from the cylindrical portion and having converging substantially flat side walls extending from diametrically opposite sides of the cylindrical side walls, a top for the portion having the cylindrical sides, and the portion having the converging sides, the casing being also formed with a cylindrical opening at one end concentric with the axis of the cylindrical portion of the body, the portion of the body having the converging sides being also provided with means for securing the body to a support and with means for connection with electrical conduits, substantially as and for the purpose specified.

15. An electrical fitting comprising a hollow body including a cup-shape casing for an electrical appliance, the casing being open at one end for permitting the insertion and removal of an appliance, and the casing being formed with interior grooves on opposite sides thereof, and a support for an electrical appliance having means extending into the grooves and secured therein, substantially as and for the purpose set forth.

16. An electrical fitting comprising a hollow body including a cup-shape casing for an electrical appliance, the casing being open at one end for permitting the insertion and removal of an appliance, and the casing being formed with interior grooves on opposite sides thereof, and a support for an electrical appliance having means extending into the grooves and secured therein, said support being U-shape in general outline, and the opposite arms thereof lying in the grooves, substantially as and for the purpose described.

17. An electrical appliance comprising a hollow body having a cylindrical chamber for receiving an electrical appliance which is circular in cross-section, the chamber being open in its bottom, and a lateral extension at one side of the chamber having means at its opposite ends for connection with the electrical conduit in which the feed wires connected to the electrical appliance are located, substantially as and for the purpose specified.

In testimony whereof I affix my signature in presence of two witnesses.

SAMUEL B. VAN RANST.

Witnesses:
M. E. ALLEN,
C. C. SCHOENECK.